United States Patent [19]

Perkins et al.

[11] Patent Number: 4,726,657
[45] Date of Patent: Feb. 23, 1988

[54] OPTICAL WAVELENGTH SELECTIVE DEVICES HAVING RIGID SUPPORT STRUCTURE

[75] Inventors: Charles V. Perkins, Cambridge; James B. Wilson, Royston, both of England

[73] Assignee: U.S. Philips Corporation, New York, N.Y.

[21] Appl. No.: 755,636

[22] Filed: Jul. 16, 1985

[30] Foreign Application Priority Data

Jul. 18, 1984 [GB] United Kingdom ............... 8418308
Mar. 29, 1985 [GB] United Kingdom ............... 8508206

[51] Int. Cl.⁴ ...................... G02B 7/02; G02B 7/18; G02B 27/00
[52] U.S. Cl. ........................................ 350/321; 356/244
[58] Field of Search ........... 350/321, 162.22, 631-633; 356/331-334, 346, 244; 270/32, 45; 248/224.4, 231.3; 220/22, 76, 83

[56] References Cited

U.S. PATENT DOCUMENTS

| | | | |
|---|---|---|---|
| 3,612,637 | 10/1971 | Betts ........................ | 220/22 |
| 3,653,531 | 4/1972 | Zurmuehlen ............... | 220/22 |
| 3,972,618 | 8/1976 | Hawes ....................... | 356/346 |
| 3,977,794 | 8/1976 | Liedholz ................... | 356/244 |
| 4,095,899 | 6/1978 | Vanasse .................... | 356/346 |
| 4,229,710 | 10/1980 | Shoshan .................... | 350/162.22 |
| 4,304,490 | 12/1981 | Murakoshi et al. ........ | 356/244 |
| 4,468,121 | 8/1984 | Koizumi et al. ........... | 356/334 |

Primary Examiner—John K. Corbin
Assistant Examiner—Loha Ben
Attorney, Agent, or Firm—Paul R. Miller

[57] ABSTRACT

Rigid supporting structures for the components of high precision optical instruments, such as interferometers or monochromators, have hitherto been based on massive castings. Such castings suffer from residual non-recoverable changes of shape during temperature cycling, due to the differential temperatures set up in the castings. The invention provides a rigid structure assembled from a number of flat sheet structural elements. Each sheet element is substantially rigid in its own plane and is attached to one or more other sheets at points of contact which are such that the edge of one sheet bears against the surface of another sheet with the planes of the two sheets being perpendicular in the region of the points of contact. An open ended rectangular box structure may be assembled from two sheets, each with a single right angled fold. Each point of contact and attachment may be formed as a foot standing proud from the remainder of the sheet edge.

13 Claims, 15 Drawing Figures

OPTICAL WAVELENGTH SELECTIVE DEVICES HAVING RIGID SUPPORT STRUCTURE

This invention relates to optical wavelength selective devices comprising one or more optical components mounted on a rigid structure.

Rigid supporting structures for the components of high precision optical wavelength selective devices, for example interferometers or monochromators, which require a high degree of stability have hitherto been based on massive castings, mainly on aluminum or steel castings. In those cases where the structure is assembled from a set of cast elements which are fixed together at discrete points, for example by bolting, temperature differences between adjacent castings will produce bending of the structure, in a manner akin to a bimetal strip. Ideally, when the temperatures of the two castings equalise the bend disappears and the whole structure returns to its former shape exactly. In practice, between the discrete fixing points, there may be frictional contact between the castings, particularly in the case where mating surfaces have been bolted together. On differential heating, there will be stick-and-slip movement between the castings at these places of frictional contact. When the temperatures equalise, the casting will not return to exactly the same relative positions at all points between the discrete points. Stresses will be left in the structure, giving rise to small changes in the structure shape. Non-repeatable misalignments will arise between optical components as the result of non uniform temperature changes which may occur, for example, during instrument transit or during a period when the ambient temperature may vary widely for example during holidays when central heating is shut off.

Even if the supporting structure is composed of a single casting, differential heating across the structure will still produce distortion and internal stress. In response to this stress, internal molecular frictional hysteresis can then occur with layers of the material irreversibly slipping past one another. When all parts of the structure reach the same temperature, the original stress due to differential heating is removed but a change of structure shape remains. It should be noted that this hysteresis effect occurs even if the castings have had internal stresses relieved by heating followed by slow cooling.

These defects in castings and in assemblies of castings have long been known. But it has hitherto been considered that the use of castings was the only way to achieve stability in high precision optical instruments with close temperature control of the whole structure being highly desirable.

It is an object of the invention enable the provision of a structure for supporting the components of a precision optical instrument which can be assembled quickly from readily available structural elements. It is another object of the invention to enable the provision of a structure which deforms only elastically in response to load or temperature changes and which returns to its original shape when loads are removed or when its temperature becomes uniform.

The invention provides a structure for supporting optical components of an optical wavelength selective device, characterised in that the rigid structure is constructed from a plurality of structural elements, in that each element comprises a flat sheet which is substantially rigid in the plane of the sheet or a flat sheet which has one right angled fold or a plurality of parallel right angled folds, and in that each sheet is attached to one or more other sheets at points of contact which are such that the edge of one sheet bears against the surface of the sheet with which it is in contact with the plane of one sheet being perpendicular to that of the other sheet at least in the region of the points of contact.

Herein, the optical wavelength selective device may be designed for operation in the ultra-violet or infrared portions of the spectrum, as well as in the visible region.

In the case of structures assembled from elements it is known to avoid frictional contact between the discrete fixing points. Structures made with pin joints between elements are common. Triangulated structures may be made with pin joints at the corners of each triangle, the joints permitting angular movement between the two sides of a triangle meeting at a joint. Expansion of the third side of the triangle then produces entirely recoverable angular movement about the pin at the joint. Tensions or compressions may be set up temporarily in the components between the pin joints but will be relieved when the entire structure is at a uniform temperature with the structure shape then being completely recovered.

However, for convenient mounting of optical components, rectangular box structures are generally preferred. Consequently the rigid structure may include two sheets, each with a single right angled fold, assembled to provide a rectangular box structure, open at both ends. The two right angled folds combine to provide additional rigidity.

To provide further additional rigidity and extra points of attachment for optical components, a rectangular third sheet may be attached to close an end of the box structure, the two adjacent edges of the third sheet being in contact with two adjacent inside surfaces of the box structure, and the two adjacent end edges of the other inside surfaces of the box structure being in contact with the surface of the third sheet. The other end of the box structure may be closed by another similar rectangular sheet.

The rectangular box structure will generally provide the overall supporting structure with the optical components usually being mounted within it. To provide further internal mounting points and to further stiffen the structure, a partition sheet may be attached inside the box structure at right angles to the box length with two adjacent edges of the partition sheet being in contact with two adjacent inside surfaces of the box structure, two apertures being formed in a first of the other two walls of the box structure to receive two tabs on a third edge of the partition sheet, one side of each aperture being formed as a point of contact with its respective tab, and a third aperture being formed in the second of the other two walls of the box structure to receive a third tab on the fourth edge of the partition sheet with one side of the third aperture being formed as a point of contact with the third tab.

The rigidity of the structure is therefore derived only from the stiffness of each sheet in its own plane. As each sheet is added to the structure during assembly, no bending or twisting stress is introduced into any sheet.

To avoid hysteresis effects in the structure a point of contact on a sheet edge, or on an edge of an aperture in a sheet, may be formed as a foot standing proud from the remainder of the edge. The points of contact between sheets are now well defined, there being no contact between two sheets other than at the feet provided. No more than two feet are provided on any one edge of a sheet, thus defining its position relative to the sheet it bears upon in one dimension. A sheet closing the end of a rectangular box structure will have two feet on one edge and only one foot on an adjacent edge, thus defining its position further. If the surface of this end sheet rests on two feet on one end edge of the box structure and on one foot on the adjacent end edge, the six points of contact uniquely define the position of the end sheet relative to the box structure.

To reduce the inclusion of built-in stress to a minimum in the assembled structure, the attachment of the foot to a surface of another sheet may be by clamping means which applies pressure substantially only between the foot and that area of the other sheet in contact with the foot. Alternatively, the foot may be attached to the other sheet by spot welding or by glueing.

For low cost and easy assembly the walls of such structures are preferably made from flat metal sheets with mild steel sheet being preferred for its cheapness and well established properties.

Embodiments of the invention will now be described, by way of example, with reference to the accompanying drawings in which:

FIG. 13 shows the major structure needed to support the optical components of the spectrometer of FIG. 12, and FIGS. 14 and 15 show details of the structure of the optical path length variation device in FIG. 12.

Figure 1:
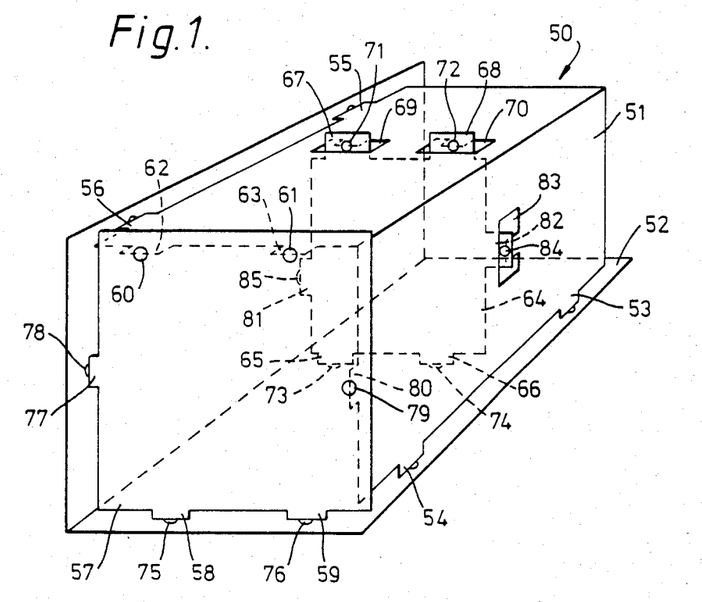
FIG. 1 shows a box structure assembled from sheets.

FIG. 1 shows a typical box structure 50 of the kind suitable for supporting the components of an optical wavelength selective device. The device may form part of an optical instrument such as a spectrophotometer and the components would then be mirrors, lenses, diffraction gratings etc. Care should then be taken not to mount any components on the structure which produce heat during operation, such as radiation sources, electrically powered detectors, or signal amplifying devices.

The supporting structure 50 is constructed from elements which comprise sheets of mild steel by a method to be described which relies only upon the stiffness of each sheet in its own plane with care being taken not to introduce any bending or twisting stress into each sheet during assembly of the structure. The sheets are attached to one another by a method based on kinematic principles and which reduces stress at fixing points to a minimum. FIGS. 2, 3, 4 and 5a and 5b show how two sheets are attached to one another at one point of contact and at right angles to one another by a screw fixing means to be described later.

The attachment points between the sheets are shown schematically as a foot in one sheet and a hole in the other sheet. Two rectangular sheets 51 and 52 are each bent into an L-shaped structure to provide four of the walls of a rectangular box. The latitude in adjustment of the attachment points allows all four of the feet 53, 54, 55 and 56 to be brought into contact with sheet 52 without elastically deforming either sheet when the fixing screws are tightened. A third end sheet 57 is provided with two feet 58 and 59 along the lower horizontal edge registering with holes 75 and 76 respectively in sheet 52 and a foot 77 on a vertical edge registering with a hole 78 in the vertical wall of sheet 52. Sheet 57 is also provided with holes 60 and 61 along its top horizontal edge registering with feet 62 and 63 on the horizontal wall of sheet 51 and with a hole 79 in the other vertical edge registering with a foot 80 on the vertical wall of sheet 51.

The feet 58, 59 and 77 can be rested on the respective walls of sheet 52 with the feet 62, 63 and 80 of sheet 51 in contact with the surface walls of sheet 57. With these six points of contact, the position of sheet 57 is uniquely defined with respect to sheets 51 and 52. The definition of position is thus kinematic. Six screws are then inserted and tightened without stressing any of the three sheets.

A fourth internal sheet wall 64 is shown attached, by way of illustration of the generality of this constructional method. Sheet 64 has two feet 65 and 66 on its lower edge, and a foot 81 on a vertical edge. Sheet 64 also has two tabs 67 and 68 on its upper edge and a tab 82 on the other vertical edge which protrude through apertures 69, 70 and 83 in the walls of sheet 51. The apertures 69, 70 and 83 are shaped to provide feet registering with holes 71, 72 and 84 respectively in sheet 64. The feet 65, 66 and 81 can be rested on sheet 52 in registration with holes 73, 74 and 85 respectively and with tongues 67, 68 and 82 in contact with the feet of apertures 69, 70 and 83. Six screws are then inserted and tightened without stressing any of the four sheets. It will be appreciated that further internal walls may be attached between two existing parallel walls using the same basic approach to provide a supporting structure for optical components which is light, rigid and unstressed and therefore not subject to hysteresis effects on temperature cycling. This light rigid structure is much easier to suspend within a thermally insulated enclosure than a structure made from massive castings. Any changes in structure temperature will occur very slowly when it is suspended within such enclosure, all parts remaining at substantially the same temperature at any one time. All dimensions will therefore expand proportionately without generating bending or twisting moments in the entire structure.

Figure 2:
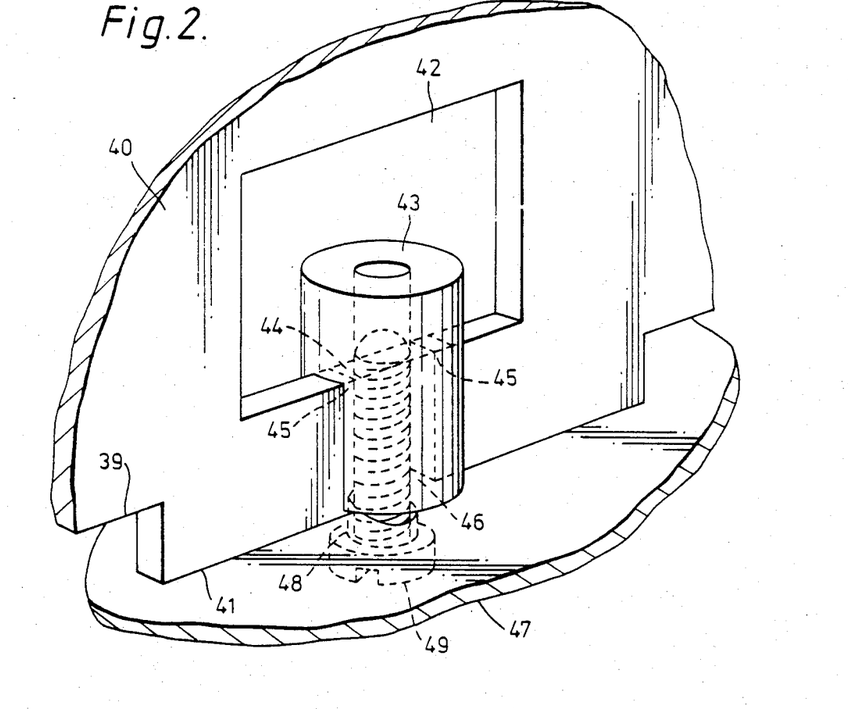
FIGS. 2, 3 and 4 show details of the point of contact between sheets, and of the attachment means.
Figure 3:
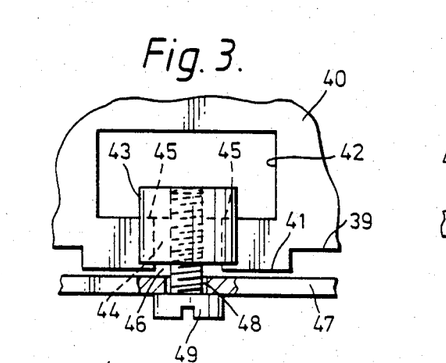
Figure 4:
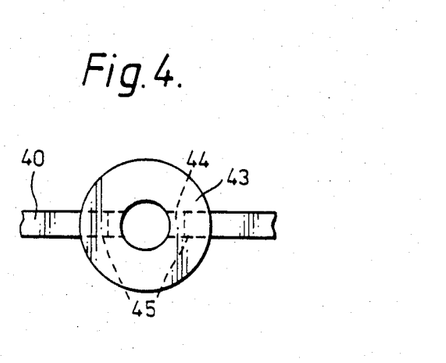

Referring to FIG. 2, the edge 39 of a sheet 40 is provided with a foot 41 which stands proud of edge 39. An aperture 42 is extended into an inlet 46 in the edge of sheet 40, centered on foot 41. A cylindrical nut 43 is provided with a diametrical slot 44 extending part-way along the nut from one end and parallel to the cylinder axis. The nut length allows it to be inserted in aperture 42 and then slid down into the inlet 46 extending from aperture 42 with slot 44 engaging shoulders 45 in sheet 40 with the lower end of the nut not extending as far as the foot 41, thus trapping nut 43 in aperture 42. Foot 41 is placed in contact with another sheet 47 at right angles to sheet 40 with inlet 46 straddling a hole 48 in sheet 47. A screw 49 is inserted in hole 48 from below sheet 47 and screwed into the threaded portion of nut 43. Upon tightening screw 49, the sheets 40 and 47 are clamped together with the clamping stress being confined to the locality of the sheets near shoulders 45 and hole 48. FIGS. 3 and 4 show other views of the sheets, the nut and the screw. The hole 48 may be enlarged to provide latitude for relative positional adjustment of the sheets, if required.

Figure 5:
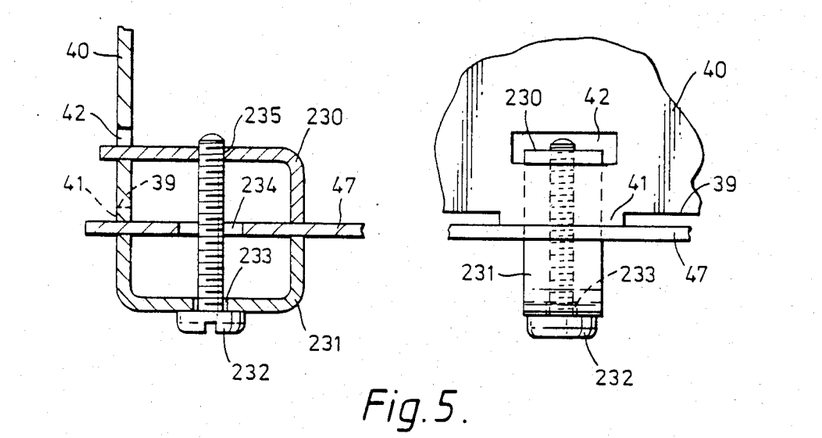
FIGS. 5a and 5b show an alternative attachment means.

FIGS. 5a and 5b show alternative clamping means for applying pressure substantially only between the foot and that area of the other sheet in contact with the foot. Again, one sheet 40 has a foot 41 on its edge 39 aligned under an aperture 42 in sheet 40. The foot bears on the other sheet 47 with the two sheets being at right angles. The clamping means comprises an "L" shaped bridging element 230 and a cooperating "U" shaped element 231. The bridging element 230 passes through aperture 42, bearing on the lower edge of aperture 42 and on the upper surface of the other sheet 47. The "U" shaped element bears on the underside of sheet 47, directly under foot 41 with one limb of the "U" and directly under the contact point of bridging element 230 with the other limb of the "U". A screw 232 passes through an aperture 233 in "U" 231, through an aperture 234 in the other sheet and engages in a threaded hole 235 in bridging element 230. When the screw is tightened, clamping force is applied between the foot and sheet 47 only in the locality of the foot. The opposed ends of the "U" and the "L" merely apply a compressive force to a small area of sheet 47. Thus, no bending or twisting stress is set up in either sheet. The accessibility of the screw for tightening in the FIG. 5 clamping means may be preferable to that of FIGS. 2, 3 and 4 in some locations on the structure.

Two applications of the structure to optical instruments will now be described. The first instrument is an echelle double monochromator for use in an atomic emission spectrophotometer. The second instrument is a Michelson interferometer for use in a Fourier transform spectrometer.

Figure 6:
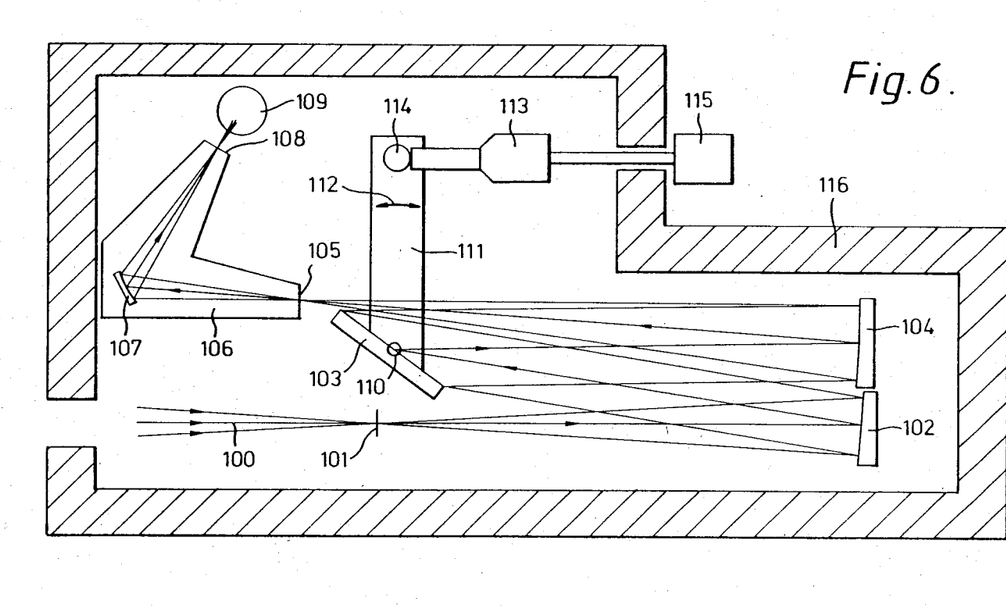
FIG. 6 shows the optical layout of an echelle double monochromator.

FIG. 6 shows the optical layout of an echelle double monochromator.

A beam of radiation 100 to be analysed is focussed by means, not shown, on an entrance slit 101 at the focal point of a concave mirror 102. The collimated beam from mirror 102 is incident on a reflection echelle diffraction grating 103. A high order dispersed beam is reflected onto a second concave mirror 104 which focusses the beam onto an exit slit 105 which is also the input slit of an order sorting post monochromator comprising a concave diffraction grating 107 and an exit slit 108. Radiation from slit 108 is incident upon a photomultiplier tube 109 which provides an output signal for analytical purposes. The echelle grating 103 is rotatable about axis 110, being mounted upon an arm 111 driven in the directions 112 by a motor driven micrometer 113 contacting a spherical member 114 attached to arm 111. The motor 115 driving the micrometer is mounted outside a thermally insulated enclosure 116.

The optical components of the double monochromator which particularly need to be held in stable positions relative to one another are the entrance slit 101, the two concave mirrors 102 and 104, the echelle grating 103 and its drive system and the exit slit 105. The remaining components also need to be stably mounted but not to the same degree of stability as the components listed above.

Figure 7:
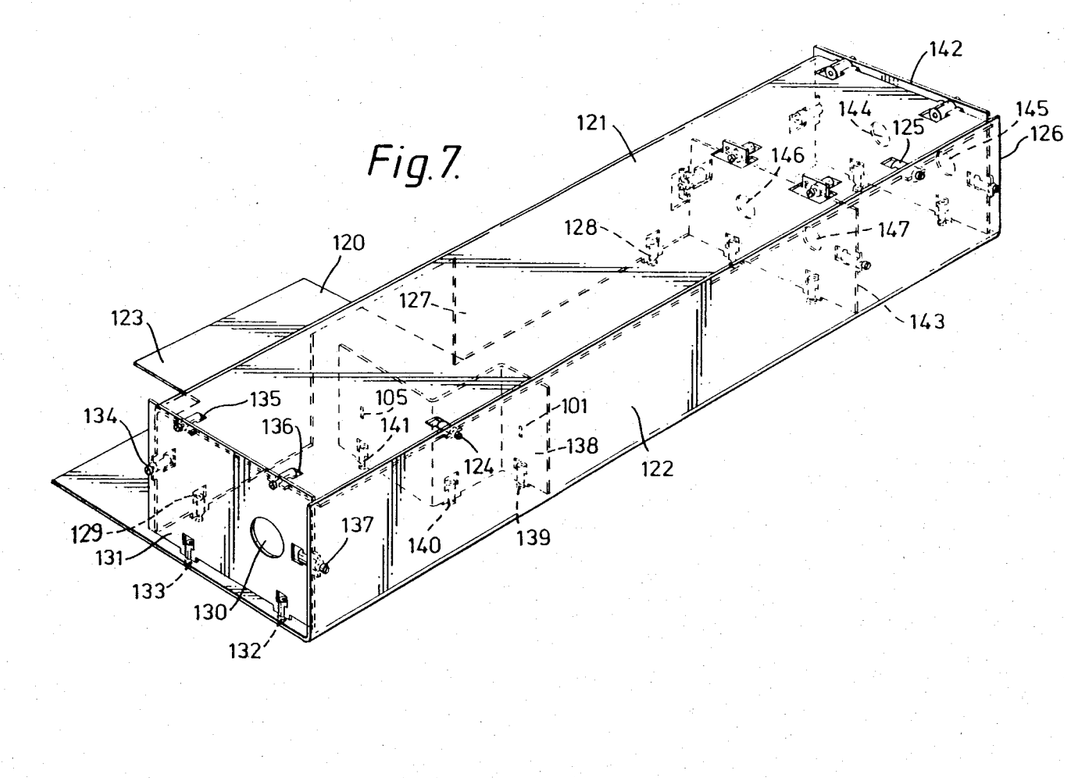
FIGS. 7 and 8 show the major structure needed to support the optical components of the monochromator of FIG. 5, FIGS. 9, 10 and 11 show details of the structure of the echelle grating arm of FIG. 6.
Figure 8:
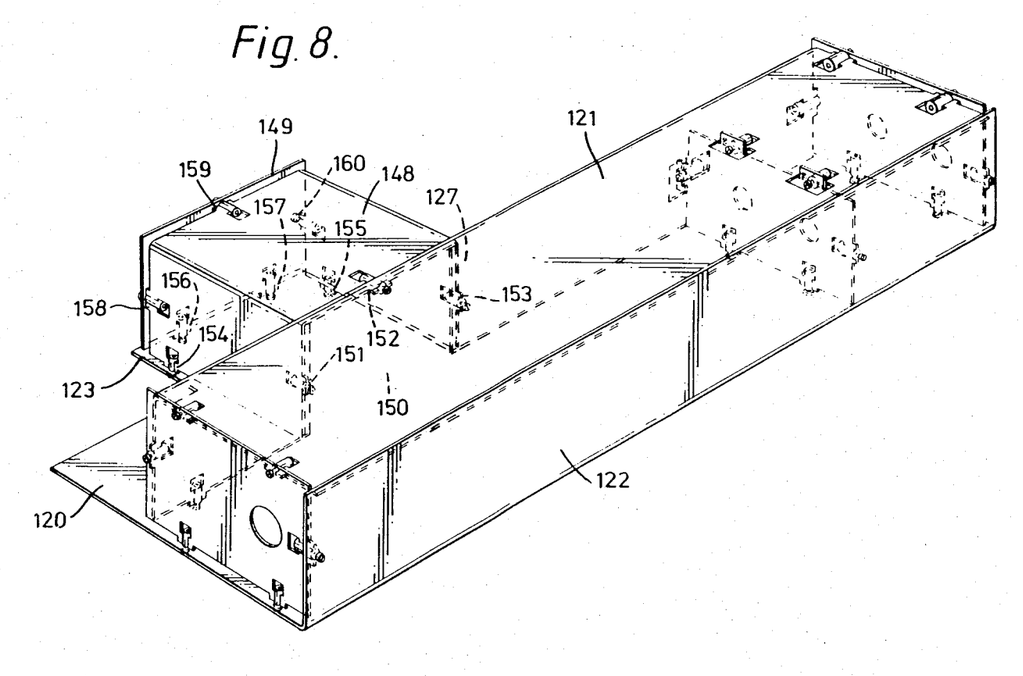

FIGS. 7 and 8 show two views of a structure in accordance with the invention for supporting the components listed above in stable positions with respect to one another while permitting a degree of adjustment of positions during assembly. For clarity, other components are not shown.

Referring to FIG. 7, the structure comprises two bent L-section sheet elements 120 and 121 assembled to form a rectangular cross-sectional box structure within which the components are mounted. Sheet 120 provides a floor 122 for the instrument and has a projection 123 extending to support a housing for the echelle grating arm and the micrometer, the housing being shown in FIG. 8. Sheet 121 has two feet 124 and 125 which rest on the inside surface of the vertical wall 126 of sheet 120, registering with holes in this wall to provide two points of attachment as described with reference to FIGS. 2, 3 and 4. The vertical wall 127 of sheet 121 has two feet 128 and 129 registering with holes in sheet 120 to provide two points of attachment. Thus a box of rectangular section is formed in the same way as that described with reference to FIG. 1. The radiation 100 enters through an opening 130 in a vertical end sheet 131 attached across the end of the box at six points of contact 132 to 137 inclusive in the same way as described with reference to sheet 57 of FIG. 1.

The entrance slit 101 and the exit slit 105 are provided in a sheet element 138 having two parallel folds to form a Z-section. Three feet 139, 140 and 141 are provided on the bottom edge of sheet 138, one each on the three flat portions of the "Z". Feet 139, 140 and 141 are spaced to provide three points of contact with floor 122, not in a straight line, which leave the Z section with only some sliding and rotational freedom in the plane of floor 122. The holes in floor 122 registering with these feet provide some degree of freedom in choice of slit positions during assembly.

A second end sheet 142 is attached across the other end of the box in the same way as sheet 131. An internal vertical wall 143 is provided in the box in the same way as described with relation to sheet 64 in FIG. 1. Sheets 142 and 143 are provided with circular holes 144, 145 and 146, 147 respectively. Holes 144 and 146 are aligned along the box axis, as are holes 145 and 147. Bearings, not shown, are mounted, one each, in these four holes to receive two parallel shafts, also not shown. The concave mirrors 102 and 104 are mounted one each on these shafts. British Patent Application No. 8416263 corresponding to U.S. patent application Ser. No. 748,524, filed June 25, 1985, now U.S. Pat. No. 4,637,695 describes how a mirror may be mounted on such a shaft and adjusted and fixed in position in a stress free manner.

FIG. 8 shows the tube of FIG. 7 with the Z-section sheet 138 removed for clarity. The housing for the echelle grating arm and the micrometer mentioned before are provided by U-section sheet 148 and a flat end sheet 149.

Wall 127 of the sheet 121 has a rectangular cut-out 150 adjacent to the projection 123 of floor 122. The three end edges of U-section 148 each have a foot, 151, 152 and 153 facing wall 127 around opening 150. The bottom edges of U-section 148 each have a foot 154, 155 near the end of projection 123. Feet 151, 152 and 153 are slid against wall 127 until feet 154 and 155 are both in contact with projection 123. Thus five points of attachment are provided. A sheet 149 which closes the far end of the U-section 148 has two feet 156 and 157 for contacting projection 123 and the three remaining end edges of U-section 148 each have a foot, 158, 159 and 160 until feet 156 and 157 are both in contact with projection 123. Thus five points of attachment are provided.

During the assembly of the entire structure of FIGS. 7 and 8, each successive element is therefore added in a manner which avoids introducing bending or twisting stress in any element as the fixing screws are tightened in an added element.

Figure 9:
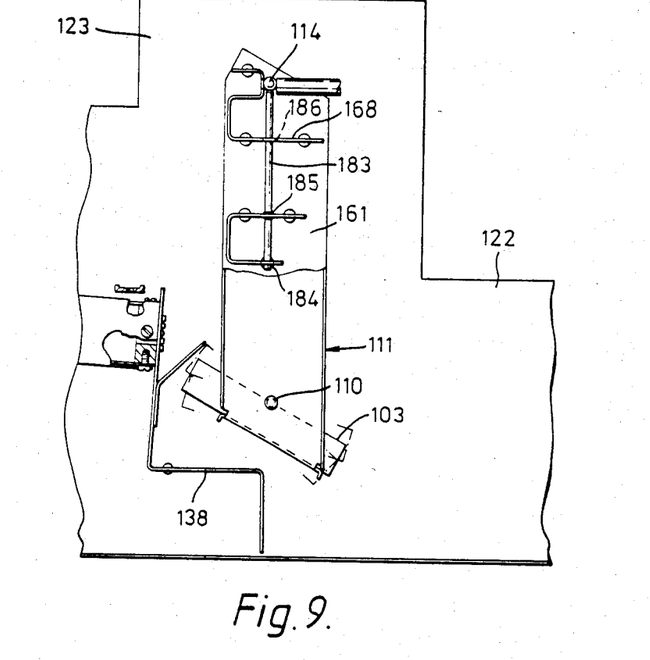
Figure 10:
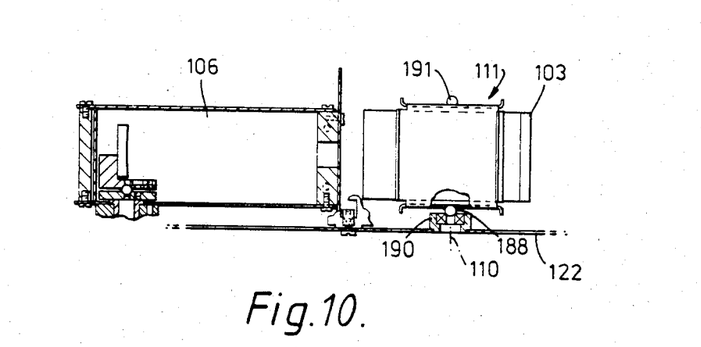
Figure 11:
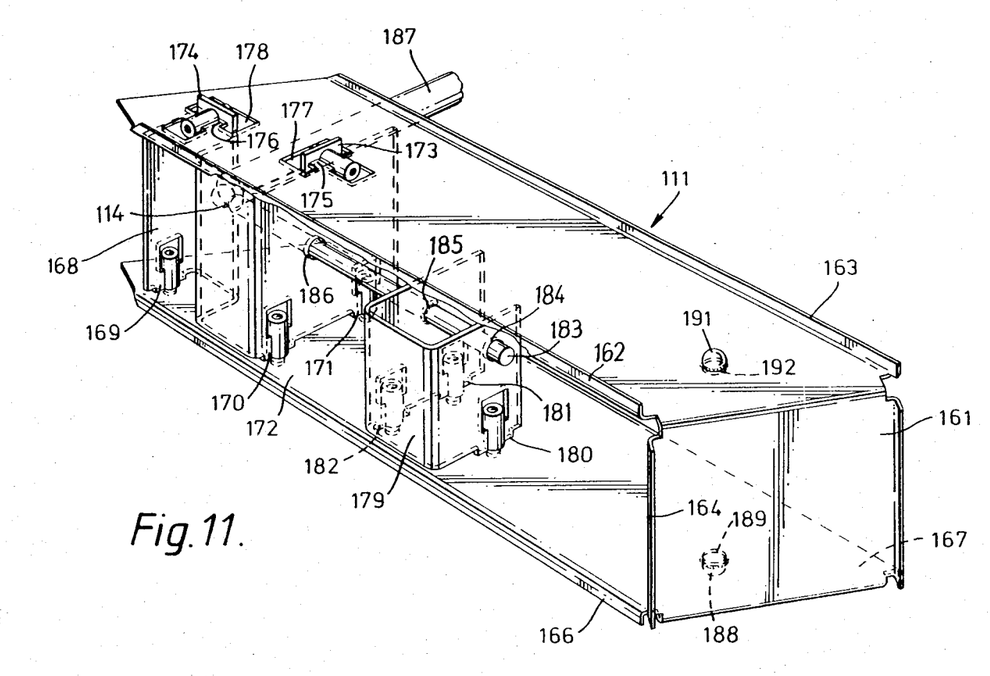

FIGS. 9, 10 and 11 show details of the echelle grating arm 111. In FIG. 9 arm 111 is shown in plan view in position relative to the Z-section 138 on floor 122. The arm comprises a bent sheet metal structure shown in detail in FIG. 11. The major element of the arm is an elongated U-section 161, the edges of the flat portions being folded up to provide stiffening ribs 162 to 167 inclusive. The open end of the U-section is provided with a folded Z-section element 168 which stablises its dimension. Three feet 169, 170 and 171 on the bottom edge of the folded "Z" position it kinematically in the plane of the lower surface 172 of the "U". Two tabs 173 and 174 at right angles to one another on the upper edge of the "Z" then define the position of the "Z" by contact with feet 175 and 176 respectively provided in apertures 177 and 178 respectively.

The reflection echelle diffraction grating 103 is glued across the bottom of the U (FIGS. 9 and 10). A second "U" section 179, of a height less than the separation of the upper and lower flat portions of the major "U", is mounted on the lower surface 172 by three feet 180, 181 and 182, arranged out of line with one another. A rod 183 passes freely through hole 184 in "U" 179 and is glued in hole 185 of "U" 179. Rod 183 also passes freely through hole 186 of "Z" 168 and has a steel ball 114 glued to its end. The end of the shaft 187 of micrometer 113 bears on the ball 114 to provide rotational drive of the arm. The body of the micrometer, not shown, is attached in a sleeve in a wall of "U" 148 of the housing shown in FIG. 8.

Axis 110 of the arm 111 is defined by a first steel ball 188 glued in a hole 189 in the lower part of the major "U" 161. Ball 188 registers in a ring bearing 190 set in floor 122. Definition of axis 110 is completed by a second steel ball 191 glued in a hole 192 in the upper part of the major "U". Ball 191 registers in a ring bearing, not shown, spring mounted in the upper horizontal part of "L" section 121 shown in FIG. 7.

Figure 12:
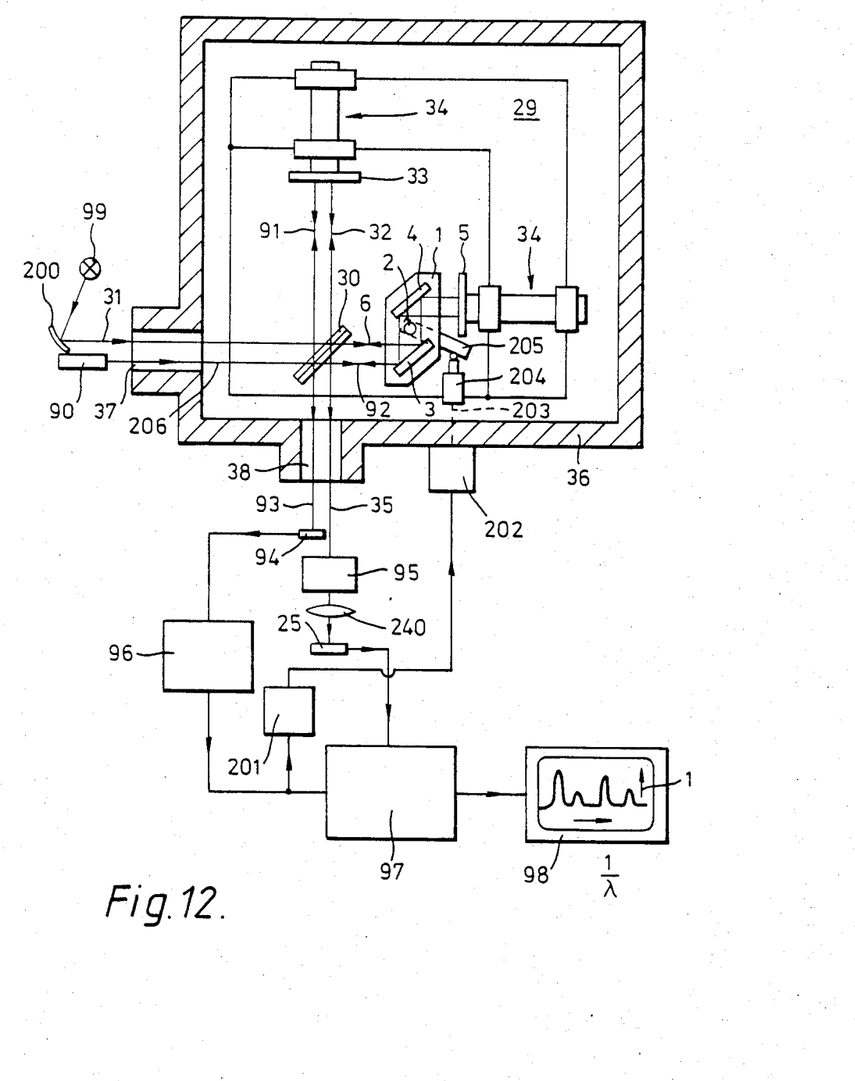
FIG. 12 shows the optical layout of a Fourier transform spectrometer.

A second application of the structure in accordance with the invention as applied in a Fourier transform spectrometer will now be described with reference to FIGS. 12, 13, 14 and 15. In FIG. 12 the optical components of the spectrometer are supported and registered in relative position by a sheet steel structure 29, which is box-like in general form and has internal walls. Structure 29 is constructed in a stress-free manner from sheet steel plates as will be described later with reference to FIGS. 13 to 15 inclusive.

Referring to FIG. 12, the input beam 31 is supplied by a broad-band infra-red radiation source 99 and collimated by concave mirror 200. A beam splitter 30 is attached to the floor of structure 29 at 45° to the beam 31. Subbeam 32 from the beam splitter is reflected by a stationary mirror 33 and returned to the beam splitter along a path of fixed optical path length. Subbeam 6 is deflected through a rotatable parallel mirror pair 3 and 4. Rotation axis 2 of platform 1 is formed by a bearing set in the floor and/or ceiling of the structure. Subbeam 6 is reflected by plane mirror 5 to retrace its path through the mirror pair along a path of optical path length which can be changed by rotating platform 1. Subbeam 6 and subbeam 32 form a combined output beam 35 which passes through the sample 95 whose absorption spectrum is to be measured. The center of the interference pattern of beam 35, produced by the focussing action of lens 240, then falls on a detector 25.

The plane mirrors 5 and 33 are mounted upon angular tilt adjusters 34 which may be of the kind described in British Patent Application No. 8416263 corresponding to U.S. patent application Ser. No. 748,524, filed June 25, 1985, now U.S. Pat. No. 4,637,695. One of the adjusters 34 provides tilt of the reflected beam in the plane of FIG. 12, the other adjuster providing tilt of its associated beam transverse to the plane of FIG. 12. When the instrument is set up during manufacture, the adjusters 34 are used to center the fringe pattern of the recombined beam 35 on the detector 25. The adjusters are then locked in position relative to the structure in the stress-free manner described in the above British Patent Application No. 8416263.

The platform 1 is driven in rotation by a motor 202 mounted outside the supporting structure. In this example, the motor is coupled by a vibration insensitive, constant-velocity coupling 203 to rotate a micrometer movement 204 bearing on a lever arm 205 attached to a shaft on platform 1 which rotates about axis 2. A pilot beam 206 of visible radiation from, for example, a helium-neon laser 90 is also fed through the optical paths of the interferometer, interference fringes being formed on a separate detector 94. The output of this detector is used in a waveform shaping circuit 96 to generate sampling instant signals which occur at intervals of one wavelength of the laser source or fractions thereof as the optical path length is changed. These sampling signals control the instants at which the output of detector 25 is sampled to provide inputs to a computer 97 which calculates the spectrum 98 of beam 31 using, for example, a program based on the known Cooley Tukey algorithm. In addition the platform drive motor 202 is controlled in speed by control circuit 201 in response to the sampling instant signals to keep the rate of sampling constant.

The off-structure mounting of the motor and its constant velocity coupling minimize the vibrational component of platform rotation, which component would degrade the output of both detectors.

The supporting structure 29 is suspended within a thermally insulating box 36, for example of polystyrene foam. The radiation sources, the detectors and any other heat dissipating components are external to box 36. Extended length clear apertures 37 and 38 of minimal diameter are provided for the input beam 31 and the output beam 35 respectively to minimize air movement in and out of box 36. With a wall thickness of 3.0 cm, a thermal time constant of an hour or more can be realised for the structure 29.

In use the optical path lengths of the two subbeams may be initially equalised with the platform 1 at one end of its working range of path length variation. The zero order fringe is then incident on the detector. Platform 1 is then driven in rotation to produce the change in optical path length necessary to realise the desired wavenumber resolution. A so-called single sided interferogram is then obtained. More desirably, the path lengths are equalised with the platform in the middle of its working range, the platform then being driven through the whole working range to produce a double sided interferogram which in use can be more easily made less susceptible to phase errors.

Figures 13, 14:
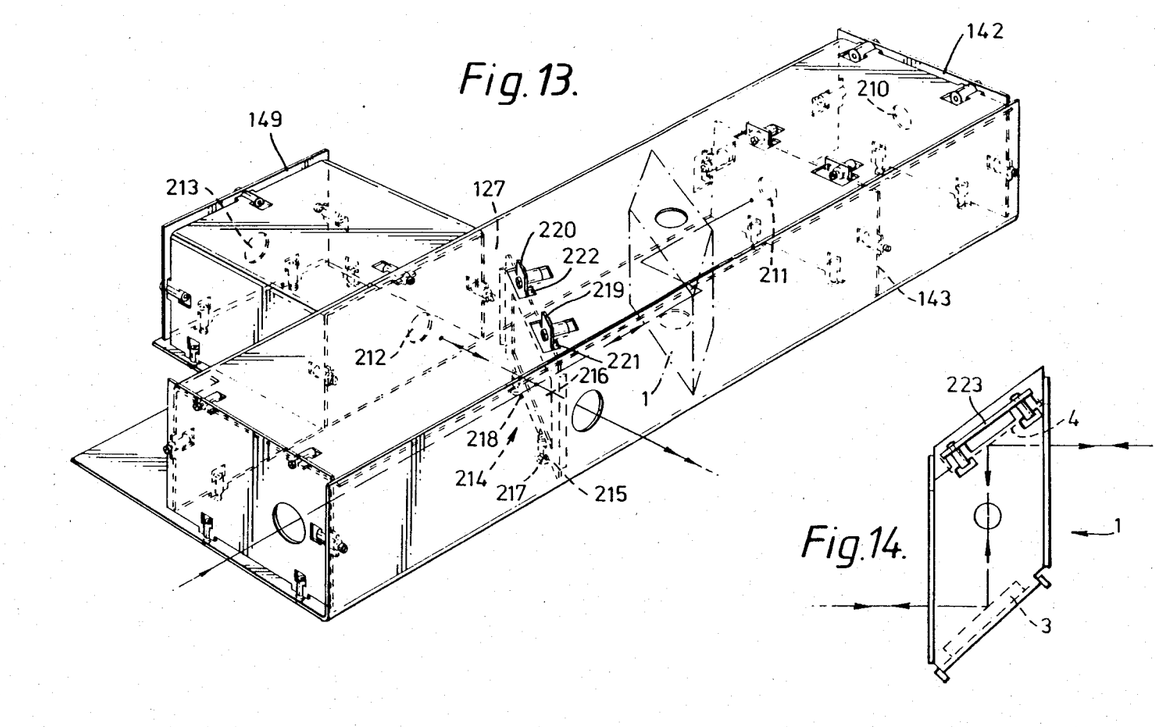

FIG. 13 shows a structure for supporting the optical components of the spectrometer of FIG. 12. The major elements of this structure are identical to those of the structure described with reference to FIGS. 7 and 8 and will not be described further here. The two sheets 142 and 143 at the right hand end of the structure now have only one pair of holes 210 and 211 respectively in which bearings are provided to support the angular tilt adjuster 34. The wall 127 does not now have the opening 150 but has hole 212 centered on the housing. A hole 213 is provided in the center of end sheet 149 which, together with hole 212, supports the second angular tilt adjuster 34.

A beam splitter assembly 214 is mounted in the box structure at 45° to the longitudinal axis. The assembly comprises a sheet 215 to which a beam splitter (not shown) is glued across an aperture 216. Two feet 217 and 218 are provided on the bottom edge of sheet 215. Two tabs 219 and 220 are provided on the top edge of sheet 215 to project through apertures 221 and 222 respectively in the top surface of the box. Apertures 221 and 222 are formed with feet to contact tabs 219 and 220 respectively. Thus four attachment points are provided, there being some degree of ajustment in the position of the lower feet 217 and 218 by virtue of the oversize holes with which these feet register.

Figure 15:
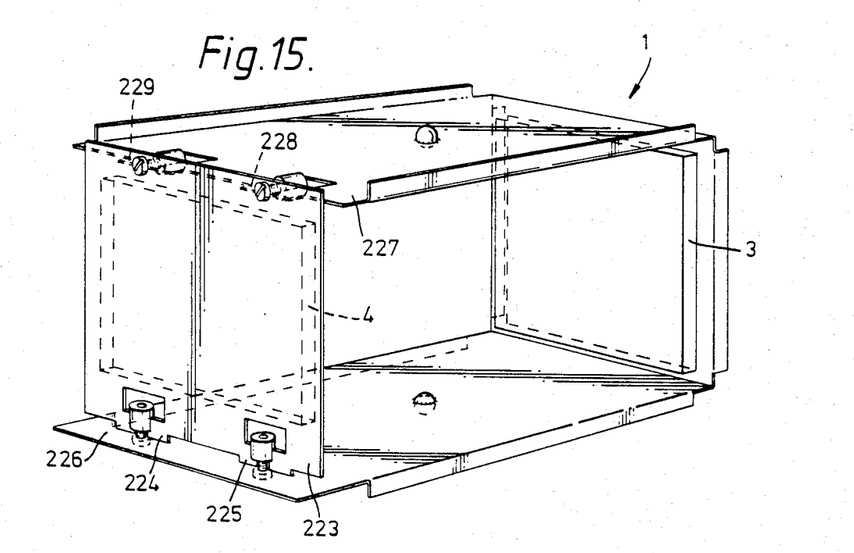

The platform 1 shown in plan in FIG. 14 and in perspective in FIG. 15 is an elongated U-shaped channel constructed similarly to the echelle grating arm 111 of FIG. 11. An end sheet 223 has two lower feet 224 and 225 contacting the lower part 226 of the 'U'. The upper part 227 of the 'U' has two feet 228 and 229 contacting the surface of sheet 223. The plane mirrors 3 and 4 are glued to the bottom of the "U" and to the end sheet 223 respectively.

We claim:

1. An optical wavelength selecftive device having a rigid support structure comprising one or more optical components mounted on said structure, said structure comprising a plurality of structural elements, each of said elements comprising a sheet having at least one right angled fold, said sheet being substantially rigid in the plane of the sheet,
    each of said plurality of sheets being attached to at least one other sheet at points of contact, said points of contact being determined by an edge of a sheet bearing against the surface of another sheet, said sheet being perpendicular to said another sheet at least in the region of said points of contact, wherein said points of contact are formed with feet standing proud from edges of said sheets.

2. A structure according to claim 1, wherein said points of contact include clamping means for applying pressure substantially only between said feet and areas of other sheets contacting said feet.

3. A structure according to claim 2, wherein said clamping means include a bridging elements for passing through first apertures formed at said areas of said other sheets at regions of said feet.

4. A structure according to claim 3, wherein said feet straddle second apertures in said other sheets, said feet resting on surfaces of said sheets at either side of said second apertures, wherein said first apertures are extended into inlets in edges of sheets bearing said feet, said inlets passing through said feet and being aligned over said second apertures, and wherein said clamping means include screws passing through said second apertures along said inlets and engaging said bridging elements.

5. A structure according to claim 4, wherein said bridging elements are nuts, and wherein said nuts have diametrical slots extending partially along said nuts from one end, said slots engaging with said sheets on either side of said inlets.

6. A structure according to claim 1 or 2, wherein said plurality of sheets include two sheets, each of said two sheets having a single right angled fold, said two sheets being assembled into a rectangular box structure open at opposite ends.

7. A structure according to claim 6, wherein a third rectangular sheet is attached to close an end of said rectangular box structure, and wherein two adjacent end edges of inside surfaces of said box structure contact a surface of said third sheet.

8. A structure according to claim 7, wherein a partition sheet is attached inside said box structure at right angles to the length of said box structure, wherein two adjacent edges of said partition sheet contact two adjacent inside surfaces of said box structure, wherein two apertures are provided in a first or two other walls of said box structure to receive two tabs on a third edge of said partition sheet, one side of each aperture being a point of contact with a respective tab, and wherein a third aperture is provided in a second of said two other walls of said box structure to receive a third tab on a fourth edge of said partition sheet, one side of said third apertue being a point of contact with said third tab.

9. A structure acording to claim 1, wherein said plurality of structural elements are suspended within a thermally insulating enclosure.

10. A structure according to claim 1, wherein said sheet each of said elements is mild steel.

11. A structure according to claim 1, wherein said wavelength selective device is a monochromator.

12. A structure according to claim 1, wherein said wavelength selective device is an interferometer.

13. A sturcture according to claim 12, wherein said interferometer is part of a Fourier transform spectrometer.

* * * * *